Jan. 30, 1923. 1,443,740
B. HASKELL.
BRAKE SUPPORT.
FILED AUG. 1, 1921.
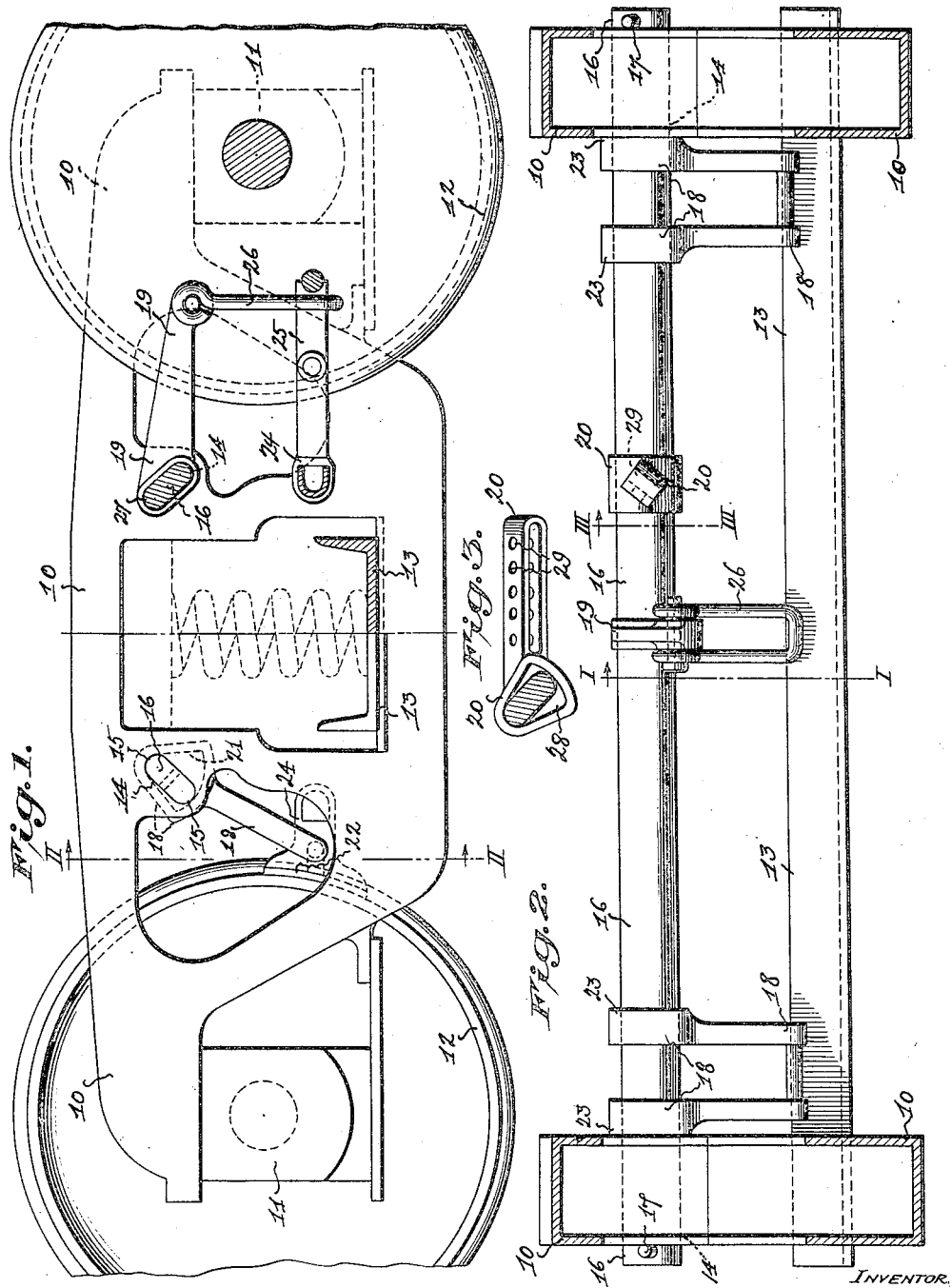

Patented Jan. 30, 1923.

1,443,740

UNITED STATES PATENT OFFICE.

BRODERICK HASKELL, OF FRANKLIN, PENNSYLVANIA.

BRAKE SUPPORT.

Application filed August 1, 1921. Serial No. 488,770.

*To all whom it may concern:*

Be it known that I, BRODERICK HASKELL, a citizen of the United States, residing at Franklin, in the county of Venango and State of Pennsylvania, have invented new and useful Improvements in Brake Supports, of which the following is a specification.

This invention relates to brake supports and more particularly to the suspension bar and hangers for suspending the brake beams, and dead lever guides for railroad car trucks.

The objects of the invention are:—

First, to provide means for supporting brake beams and dead lever guides used in connection with the braking of railroad car trucks which can be cheaply manufactured, easily applied and adjusted or removed from the truck frame.

Second, to provide means, as above indicated, which will enable a brake beam hanger of increased size and bearing surface to be employed, thereby increasing the strength of the same and at the same time effecting less wear and slack or lost motion to the gear controlling the application of the brakes.

Third, to provide a device of the character above referred to in which all lugs cast integral with the truck frame, and pins for connecting the brake hanger are eliminated, thereby materially simplifying the cost and construction of the brake gear and reducing to a minimum the liability of the brake beam falling on the track by reason of broken brake hangers or hanger pins which frequently occur from the present constructions causing bad and expensive wrecks.

Fourth, to provide a means to prevent the tilting or inefficient position of the brake beams and at all times holding them normal to the wheel axles, so that the top of the brake shoes will not be applied and continue grinding against the wheels when the brakes are not being applied.

Fifth, to construct and arrange the suspension bar carrying the brake hangers so as to more directly resist the pull or strain when the brakes are applied.

Other objects and advantages of the invention will appear and be understood from the detailed description of the construction and arrangement of parts to be presently given.

The invention consists of structural characteristics and relative arrangements of elements which will be hereinafter more fully described and particularly pointed out in the appended claims.

In the one sheet of drawings, similar reference characters indicate the same parts in the several figures, in which, Figure 1 shows on the left half a side elevation of the truck frame while on the right half a section on line I—I, of Figure 2 with the brake beam removed;

Figure 2 is a transverse sectional view taken on line II—II of Fig. 1 with the car wheel and brake beam removed, and Figure 3 is a section on line III—III of Figure 2, showing dead lever guide.

Referring to the drawings, 10 represents the usual cast steel truck frame on each side of a car truck carrying the standard forms of boxes 11, wheels 12 and spring plank 13. Each of said truck frames 10 is of channel shape, as shown in Fig. 2, and is provided in both of its walls with aligned and oppositely disposed rectangular openings 14, 14, having their smaller sides 15 preferably rounded as shown, but any other shape may be employed if so desired.

A suspension bar 16 of the same cross-section as the openings 14 is inserted in said openings 14, 14, and is of such a length as to extend from the outer side of one truck frame 10 to and through the openings 14 of the opposite frame 10, and are held in position in said frames 10 by means of cotter pins 17, 17, passing through suitable holes in the outer ends of the bar 16, as shown in Fig. 2. This construction provides a rigid, non-rotatable and strong support which is readily accessible and capable of being easily manufactured and inserted or removed from the truck frames without being required to detach or disturb any of the elements of car truck. After one end of the suspension bar 16 is inserted through the openings 14, 14, of a truck frame and is passing towards the other and opposite frame 10, said inner end of the bar 16 is passed first through a brake hanger 18, then through a supporting arm 19, and a dead lever guide 20, and lastly through another brake hanger 18, said brake hangers 18, supporting arm 19 and guide 20 being so adjusted as to assume the positions shown in Figure 2 in which the brake hangers 18, 18, are in juxtaposition to the inner walls of the frames 10, the supporting arm 19 midway between the inner sides of said brake hangers 18, and the dead lever guide 20 interposed between a brake hanger 18 and the supporting arm 19, for purposes that will be readily understood and needs no further disclosure.

Each of said brake hangers 18 is preferably of U-shape in form and is provided with sector-shaped openings 21 for loosely receiving and being supported by the suspension rod 16, so as to permit said brake hangers 18 to oscillate on its supporting rod 16 and correctly guide under all conditions of service, the outer ends of the brake beam 24 to which the lower ends of said brake hangers 18 are connected, thereby enabling the brake shoes 22 on the ends of the brake beam 24 to properly engage or be released from the periphery of the wheels 12, for purposes readily understood. Said brake hangers 18 are also preferably provided on their outer faces with enlargements or lugs 23 of sufficient width and length to engage the inner face of the adjacent truck frame 10 in order to hold said brake hangers 18 in proper position on the suspension bar 16, and prevent longitudinal movement of the brake beam 24 which is supported through its strut 25 by means of the link 26 pivotally connected to the outer end of the supporting arm 19 having a loose or sliding fit with the suspension bar 16 by an opening 27 having the same shape as the cross-sectional arm of the suspension bar or rod 16, as clearly shown in the right half of Figure 1.

The dead lever guide or support 20, as clearly shown in Figure 3, is also provided at the end surrounding the suspension bar or rod 16 with a sector-shaped opening 28, similar to those in the hangers 18 for the purpose of enabling said guide 20 to oscillate or change its relative position with respect to the rod 16 when an adjustment of the dead lever is made by means of the usual openings 29 common in this class of brake gears and needs no further disclosure.

From the shapes or cross-sectional area of the suspension bar 16 and the cooperating sector-shaped openings 21 in the brake hangers 18, not only is a maximum bearing surface effected with a minimum of friction between said brake hangers and its supporting means, but at the same time the strain or resistance when the brakes are applied is taken up and is in the direction of greatest depth of the bar 16, and the shape of the opening 21 also permits the brake hangers to quickly and properly arrange themselves with respect to their brake beam connections and points of support on the suspension bar 16 as to correctly adjust, apply or release the brake shoes with respect to the wheels 12 in order to have the different elements comprising the brake gear mechanism to have positive, safe and efficient action in continued use and all conditions of service.

From the foregoing disclosure of the construction and arrangement of the improvement and mode of applying the same, it will be seen that all the objects and advantages recited in the statement of invention have been fully and efficiently carried out, and while I have shown and described my preferred form of the bracket many changes will readily suggest themselves without in any way departing from the salient features herein disclosed and embodied in the scope of the claims.

What I claim is:

1. A car truck comprising side frames having inner walls and oppositely disposed openings therein, a suspension bar extending between and supported in said openings, an oscillating brake hanger adjacent to the inner wall of each of said side frames and supported from said suspension bar and a brake beam having its ends connected to the free ends of said oscillating brake hangers.

2. A car truck comprising side frames having oppositely disposed openings therein, a suspension bar of elongated cross-section and extending between and supported in said openings, an oscillating brake hanger adjacent to the inner wall of each of said side frames and supported from the upper side of said suspension bar and a brake beam having its ends connected to the free ends of said oscillating brake hangers.

3. A car truck comprising side frames having oppositely disposed openings therein, a suspension bar extending between and supported in said openings, an oscillating brake hanger having an end with a sector-shaped opening and adjacent to the inner wall of each of said side frames and supported from said suspension bar by said sector-shaped opening and a brake beam having its ends connected to the other or free ends of said oscillating brake hangers.

4. A car truck comprising side frames having oppositely disposed elongated openings therein, a suspension bar of the same cross-sectional area as said elongated openings and extending between and supported in said openings, an oscillating brake hanger having an end with a sector-shaped opening and adjacent to the inner wall of each of said side frames and supported from said suspension bar by said sector-shaped opening and a brake beam having its ends connected to the other or free ends of said oscillating brake hangers.

5. A car truck comprising side frames having oppositely disposed openings therein, a suspension bar extending between and supported in said openings, a supporting arm between said side frames and carried by said suspension bar, a link pivotally suspended from the end of said suspension bar and a brake beam movably connected and supported from the free end of said link.

6. A car truck comprising side frames having oppositely disposed openings therein, a suspension bar extending between and supported in said openings, a supporting arm between said side frames and removably attached and carried by said suspension bar, a link pivotally suspended from the end of said suspension bar and a brake beam movably connected and supported from the free end of said link.

7. A car truck comprising side frames having oppositely disposed openings therein, a suspension bar extending between and supported in said openings, an oscillating brake hanger adjacent to the inner wall of each of said side frames and supported from said suspension bar, a brake beam having its ends connected to the free ends of said oscillating brake hangers and an oscillating dead lever guide between said brake hangers and carried by said suspension bar.

8. A car truck comprising side frames having oppositely disposed openings therein, a suspension bar of elongated cross section and extending between and supported in said openings, an oscillating brake hanger having an end with a sector-shaped opening and adjacent to the inner wall of each of said side frames and supported from said suspension bar by said sector-shaped opening, a brake beam having its ends connected to the free ends of said oscillating brake hangers and an oscillating dead lever guide between said brake hangers and provided with an end having a sector-shaped opening adapted to receive and loosely engage said suspension bar.

In testimony whereof I affix my signature.

BRODERICK HASKELL.